United States Patent [19]

Werner et al.

[11] Patent Number: 4,766,021

[45] Date of Patent: Aug. 23, 1988

[54] OPTICAL RECORDING MEDIUM

[75] Inventors: Arend Werner, Bad Durkheim; Hartmut Hibst, Ludwigshafen; Juergen Petermann, Buxtehude, all of Fed. Rep. of Germany

[73] Assignee: BASF Aktiengesellschaft, Ludwigshafen, Fed. Rep. of Germany

[21] Appl. No.: 22,826

[22] Filed: Mar. 6, 1987

[30] Foreign Application Priority Data

Mar. 12, 1986 [DE] Fed. Rep. of Germany ....... 3608267

[51] Int. Cl.$^4$ .................... B32B 5/12; G01D 15/10
[52] U.S. Cl. ......................................... 428/64; 428/98; 428/114; 428/148; 428/689; 430/945; 346/76 L; 346/135.1
[58] Field of Search ............... 428/65, 114, 148, 689, 428/98; 430/945; 346/135.1, 76 L

[56] References Cited

U.S. PATENT DOCUMENTS

| | | | |
|---|---|---|---|
| 3,520,664 | 7/1970 | York | 428/621 |
| 3,816,237 | 6/1974 | Barrall et al. | 428/64 |
| 3,901,851 | 8/1975 | Kohno et al. | 428/336 |
| 4,304,807 | 12/1981 | Kawakami et al. | 428/148 |
| 4,425,570 | 1/1984 | Bell et al. | |
| 4,610,903 | 9/1986 | Nomura et al. | 428/64 |

FOREIGN PATENT DOCUMENTS 3204076  1/1984  Fed. Rep. of Germany .

OTHER PUBLICATIONS

Takeshima et al., "Optical Properties of Polycarbonate Substrate for Optical Discs", Proceedings of the SID, vol. 25/3, 1984.
Morrison and Boyd, *Organic Chemistry* (3rd ed.), Allyn and Bacon, Inc., Boston, (1973), pp. 1045–1046.
A. Huijser, Physica 127B, pp. 90–94, (1984).

*Primary Examiner*—John E. Kittle
*Assistant Examiner*—Beth A. Bozzelli
*Attorney, Agent, or Firm*—Keil & Weinkauf

[57] ABSTRACT

Optical recording media for recording and retrieval of information by means of high energy radiation, which media consist essentially of a polymeric base having uniaxial orientation and, applied on this, a metal film of high reflectivity having the orientation of the crystallites corresponding to the orientation of the base and retrieval of information are effected by means of high energy radiation.

2 Claims, No Drawings

OPTICAL RECORDING MEDIUM

The present invention relates to optical recording media which essentially consist of a polymeric base and, applied on this, a metal film of high reflectivity, and in which the recording and retrival of information is effected by means of high energy radiation.

The recording of information on a base, provided with a storage layer, by means of an energy beam which varies in its intensity or beam width as a function of the information to be stored, where the base is bared at the points of the layer which are struck by the energy beam, has long been known (German Published Application No. 1,277,344).

One variant of optical storage which was much investigated at the time was based on the formation of such holes in a metal film of high reflectivity. These marks (holes) have a lower reflectivity than their surrounding area, i.e. the reflectivity of the substrate, and can therefore be recorded by scanning with a laser. To produce the marks, the layer-forming material is irradiated with a laser whose power is substantially higher than that of the read laser. As a result, the layer heats up and the layer material vaporizes or melts in the irradiated region. In both cases, a hole is formed as an inscribed mark. In particular, Te, Bi and In, as well as their compounds, are used as layer materials (inter alia, A. Huiper, Physica 127 B (1984), 90–94). These are applied to glass or plastic substrates by vapor deposition under greatly reduced pressure or cathode sputtering.

A different method of optical storage utilizes the different reflectivities of layers when they undergo a transition from the amorphous to the crystalline state. This storage method too is carried out by means of high energy radiation whose energy, however, is not sufficient to produce holes in the storage layer. An advantage of the storage media, whose effective components are generated tellurium and/or selenium layers, is the possibility of a reversible procedure. This principle has also been disclosed (inter alia, German Laid-Open Application DOS No. 3,204,076).

The layers can be deposited in either polycrystalline or amorphous form. On the glass or plastic layers usually employed, the crystallites grow in orientations which vary randomly from crystallite to crystallite. The polycrystalline modification has the advantage of high write sensitivity. However, since the different crystal phases of these materials have different reflectivities and grow at different rates during coating, a polycrystalline layer in which the crystallites possess random crystallographic orientations has a high noise level. This disadvantage can be reduced by using amorphous layers, although this has the disadvantage that the write sensitivity is reduced.

It is an object of the present invention to provide optical recording media which have improved write sensitivity as well as an improved noise level.

We have found that this object is achieved and that, surprisingly, optical recording media of the type described at the outset exhibit the required improvements, if the polymeric base is a uniaxially oriented plastic film and the polycrystalline metal film deposited on this has the uniform crystallographic orientation of the crystallities, corresponding to the orientation of the base.

With the aid of the novel optical recording medium, it is possible to combine the use of polycrystalline layers, which is advantageous for the write sensitivity of such media, with an improvement in the noise level, which is achieved by means of the uniform crystallographic orientation of the crystallites. The optical recording media defined in this way, can be used for both recording principles, i.e. for the ablative recording method as well as the reversible one involving the crystalline/amorphous phase transition.

The polymeric base which is suitable for the novel recording media consists of a uniaxially oriented plastic film, e.g. polyethylene, polypropylene, polybut-1-ene or isotactic polystyrene. These substances can be used in the form of thin films or as sheet-like substrates. They are obtained by solid-state polyermization, by cold stretching or by orienting the polymer from the melt. An essential property of these uniaxially oriented bases is their semicrystalline or fully crystalline structure. In an advantageous embodiment of the subject of the invention, the base consists of a base material conventionally used for optical recording media, e.g. polymethyl methacrylate (PMMA), and the uniaxially oriented polymer film applied on this.

The metal films are then applied on bases of this type. To do this, in particular tin, tellurium, bismuth or indium is deposited on the base by the PVD technique, for example by vapor deposition under reduced pressure of less $10^{-5}$ mbar. In this procedure, the metals are deposited epitactically on the uniaxially oriented base. The crystallographic directions exhibiting the closest packing are parallel to the chain direction of the polymer films. The polymer lattice and metal lattice need not be adapted to one another. The epitaxy of the deposited metal films is determined by means of electron diffraction. The oriented structure of the metal layer on the uniaxial base is shown by way of example in the Table for a selection of substances. In the Table, K denotes the orientation of the crystal plane of the metal layer with respect to the uniaxial preferred direction of the base.

TABLE

| Uniaxially oriented base | Metal Layer | | | |
|---|---|---|---|---|
| | Sn (tert) | Te (hex) | Bi (hex) | In (tert) |
| Polyethylene | | | | |
| Epitaxy | pronounced | pronounced | pronounced | — |
| K | [c] ‖ [100] | [c] ‖ [001] | [c] ‖ [102] | |
| Polypropylene | | | | |
| Epitaxy | very pronounced | pronounced | very pronounced | slight |
| K | [c] ‖ [100] | [c] ‖ [001] | [c] ‖ [102] | [c] ‖ [101] |
| Polybut-1-ene | | | | |
| Epitaxy | very pronounced | very pronounced | very pronounced | pronounced |
| K | [c] ‖ [100] | [c] ‖ [001] | [c] ‖ [102] | [c] ‖ [101] |

EXAMPLE

A PMMA substrate is covered with a thin polybut-1-ene film. The film is coated with a 30 mm thick Te layer under a pressure of $10^{-5}$ mbar by vapor deposition in a high vacuum vaporization unit. Investigations with the transmission electron microscope indicate a clear texture: the C axis of the hexagonal Te crystallites lies in the plane of the layer, parallel to the molecular chains of the polybut-1-ene film. Write/read tests using semiconductor laser (820 nm) indicate an improvement in the noise level.

We claim:

1. An optical recording medium for recording and retrieving information by means of high energy radiation, essentially consisting of a polymeric base and, applied on this, a polycrystalline metal film of high reflectivity, wherein the polymer base consists essentially of a polymer substrate and a uniaxially oriented polymeric surface layer and the polycrystalline metal film has the uniform crystallographic orientation of the crystallites corresponding to the orientation of the base.

2. An optical recording medium as claimed in claim 1, wherein the metal of the layer deposited by vapor deposition is tin, tellurium or bismuth.

* * * * *